United States Patent
Beasley

(10) Patent No.: US 9,861,235 B2
(45) Date of Patent: Jan. 9, 2018

(54) BASKET APPARATUSES FOR USE IN PREPARATION OF FOOD PRODUCTS

(71) Applicant: Monte S. Beasley, Anderson, SC (US)

(72) Inventor: Monte S. Beasley, Anderson, SC (US)

(*) Notice: Subject to any disclaimer, the term of this patent is extended or adjusted under 35 U.S.C. 154(b) by 861 days.

(21) Appl. No.: 13/917,185

(22) Filed: Jun. 13, 2013

(65) Prior Publication Data

US 2013/0340630 A1 Dec. 26, 2013

Related U.S. Application Data

(60) Provisional application No. 61/659,156, filed on Jun. 13, 2012.

(51) Int. Cl.
*A47J 37/12* (2006.01)

(52) U.S. Cl.
CPC .............. *A47J 37/1295* (2013.01)

(58) Field of Classification Search
CPC ....... A47J 37/1295; A47J 27/04; A47G 19/30; A47G 7/047; A47F 5/13; A47F 5/01; A47B 87/0207; B65D 21/048; B65D 7/20; B65D 7/14
USPC ............ 99/416, 417; 211/85.4, 133.5, 126.9, 211/126.8, 181.1; 220/486, 485, 489, 220/490, 493, 494, 495
See application file for complete search history.

(56) References Cited

U.S. PATENT DOCUMENTS

| | | | | |
|---|---|---|---|---|
| 3,887,073 A * | 6/1975 | Wilson | ............. | B65D 21/048 206/507 |
| 4,006,675 A * | 2/1977 | Lill | ............. | A47J 37/1295 211/126.9 |
| 4,015,743 A * | 4/1977 | Beretta | ............. | B65D 21/0211 206/511 |
| 4,600,103 A * | 7/1986 | Tabler | ............. | B65D 21/041 206/505 |
| 5,035,326 A * | 7/1991 | Stahl | ............. | B65D 21/041 206/505 |
| 5,871,115 A * | 2/1999 | Kohn | ............. | A47F 5/01 206/506 |
| 6,415,934 B1 * | 7/2002 | Veltrop | ............. | A47J 37/1295 211/85.4 |
| 2009/0045201 A1 * | 2/2009 | Cheng | ............. | A47B 67/04 220/494 |

* cited by examiner

*Primary Examiner* — Phuong Nguyen
(74) *Attorney, Agent, or Firm* — J. Bennett Mullinax LLC

(57) ABSTRACT

Basket apparatuses for use in food product preparation are provided that can be placed in cooking apparatuses. The basket apparatuses can include a plurality of side walls of one or more base sheets forming unitary side wall lattice-like portions and forming side wall component connection portions. The basket apparatuses can include a bottom wall of a base sheet forming a unitary bottom wall lattice-like portion and forming bottom wall component connection portions. The bottom wall is attached to the side walls to define a food product receiving space. The basket apparatuses includes a plurality of shelves with each shelf being pivotally connected to opposing side walls and movable between a stackable horizontal position and a stackable vertical position in the food product receiving space. Each shelf includes a base sheet forming a unitary shelf lattice-like portion having apertures therein forming substantially flat surfaces on which food products are placeable.

20 Claims, 10 Drawing Sheets

BASKET APPARATUSES FOR USE IN PREPARATION OF FOOD PRODUCTS

RELATED APPLICATIONS

This application claims priority to U.S. Provisional Patent Application Ser. No. 61/659,156, filed Jun. 13, 2012, the entire contents of which is hereby incorporated by reference herein.

TECHNICAL FIELD

The subject matter disclosed herein relates generally to apparatuses used in food preparation. More specifically, the subject matter disclosed herein relates to basket apparatuses that can hold food products during cooking of the food products, for example, basket apparatuses for holding food products in a deep frying apparatus, such as a deep fryer.

BACKGROUND

Various types of containers or baskets are used for holding food products during cooking. For instance, wire form baskets are used for holding various types of food products, such as potatoes, pies, meat products and the like in a deep frying apparatus. Typically, the baskets are loaded with the bulk food products and are lowered into a reservoir of hot frying oil. In preparing french fried potatoes, for instance, a typical wire form basket simply is of an open-top structure, rectangular in configuration, and includes upright side walls about a bottom wall. One or more handles may be provided for manually or automatically lowering the wire form basket and food products into the hot frying oil.

Another type of food product prepared by a deep frying apparatus is chicken filets. If the filets simply are deposited in a bulk-type basket as described above for potato products, the filets tend to curl-up during cooking. Such a product not only appears to be smaller in size, but the curled-up filets are difficult to use in sandwich products, such as in high volume restaurants or similar establishments. Even if the filets are arranged on a flat support, the filets still have a tendency to curl-up during cooking. Restaurants have been using shelved wire form baskets to address these problems.

These wire baskets that are used to fry food, though, are subjected to extreme cooking conditions that include extreme pressures and high temperatures. Further, due to the nature of the kitchen environment within restaurants and the speed at which the cooks and their machines must operate, these wire baskets are subjected to abusive treatment. Under such cooking conditions and kitchen environments, these baskets are often damaged and are in need of repair. In particular, current wire baskets have a tendency to warp and detach at the wire connection points after only a limited amount of use. Thereby, these wire baskets start to fall apart making them much less effective or even inoperable for their intended use in a relatively short time period. These wire baskets then have to be sent off for repairs that can take an extended amount of time. Thus, the users of the wire baskets, such as restaurant, will likely need multiple wire baskets for each cooking apparatus in order to prevent the possibility of creating unscheduled and unwanted downtime for the respective cooking apparatus.

A need exists for basket apparatuses for holding food products in a cooking apparatus that can withstand the cooking conditions within which the basket apparatuses are placed to permit for an extended use life of the basket apparatuses with less down time for repairs.

SUMMARY

It is an object of the present disclosure to provide novel basket apparatuses for use in food preparation. For example, the basket apparatuses disclosed herein can comprise basket apparatuses that can hold food products during cooking of the food products, for example, basket apparatuses for holding food products in a deep frying apparatus, such as a deep fryer.

While a few objects of the presently disclosed subject matter have been stated hereinabove, which can be achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1A:
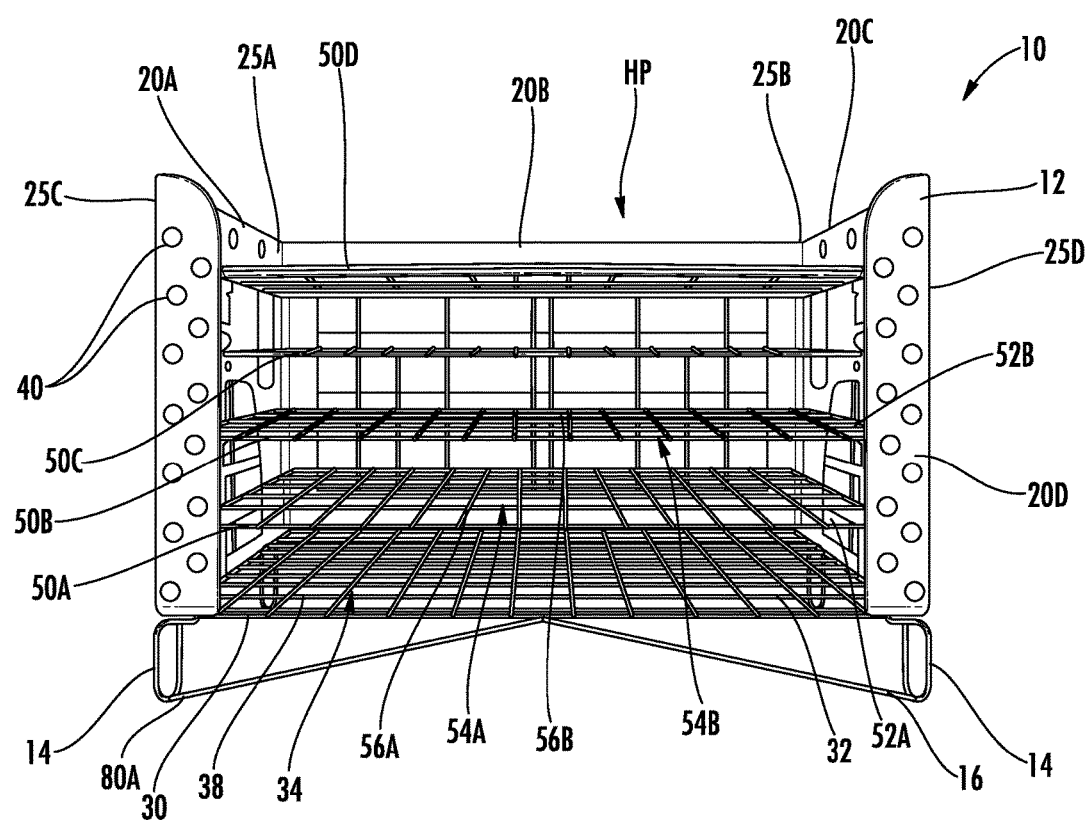
FIG. 1A illustrates a front plan view of an embodiment of a basket apparatus for use in food preparation according to the subject matter disclosed herein.
Figure 1B:
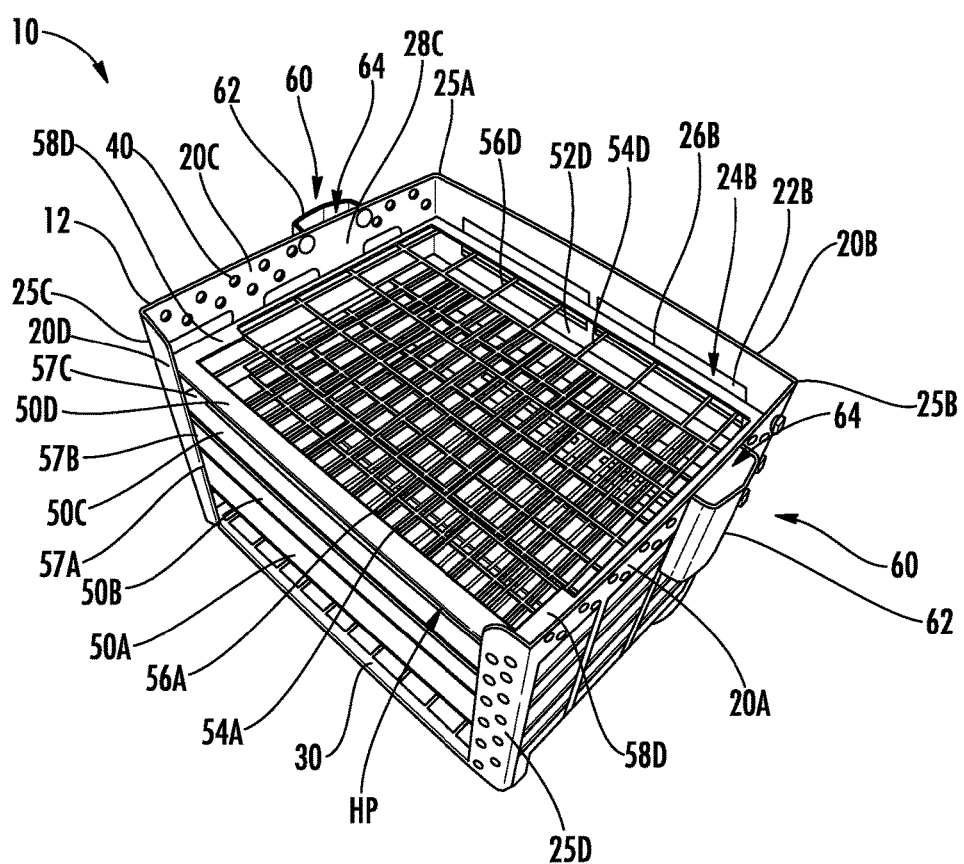
FIG. 1B illustrates a top perspective view of the embodiment of the basket apparatus for use in food preparation according to FIG. 1A.
Figure 2:
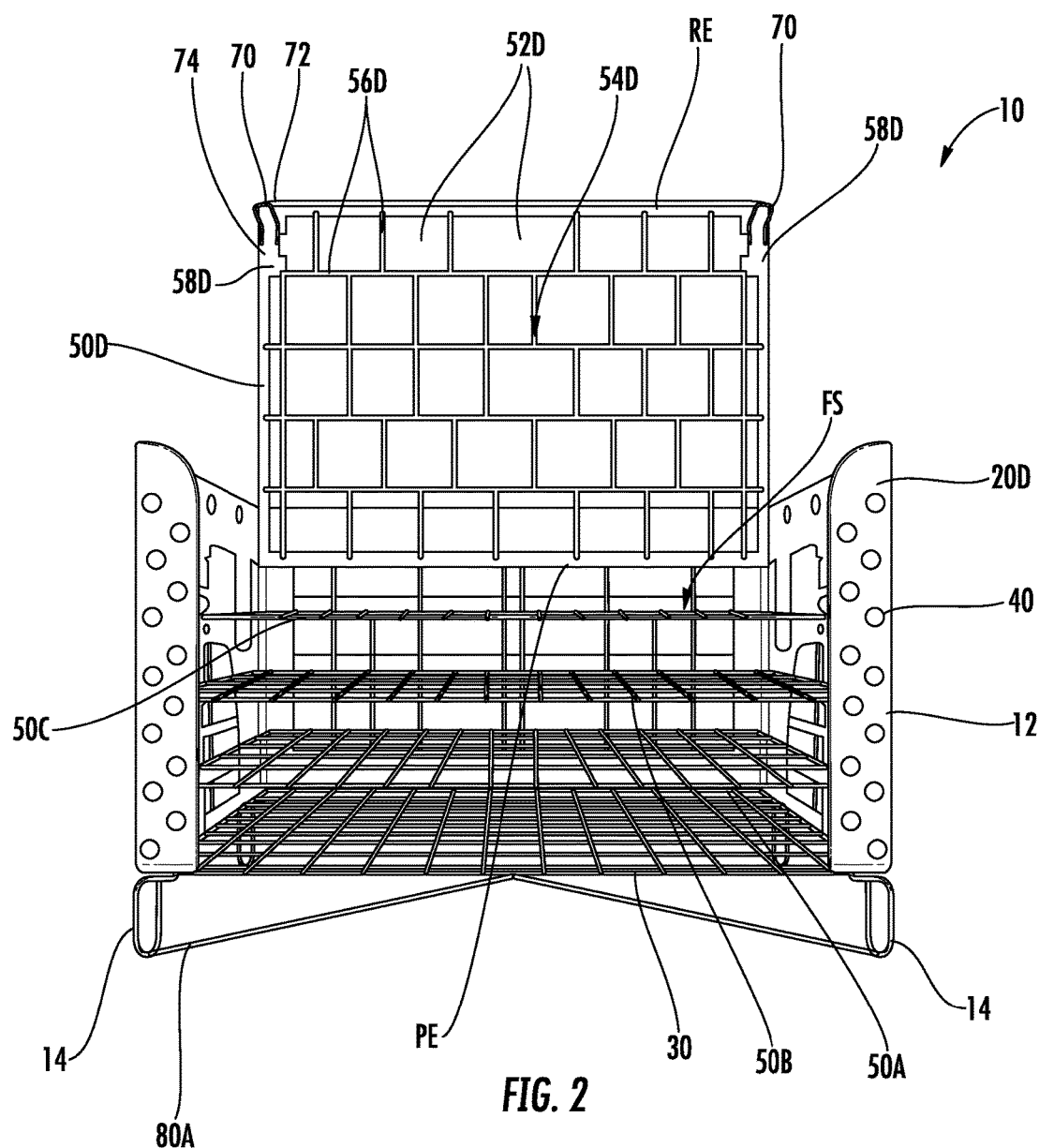
FIG. 2 illustrates another front plan view of the embodiment of the basket apparatus for use in food preparation with an embodiment of an upper shelf in a vertical position according to FIG. 1A.
Figure 3:
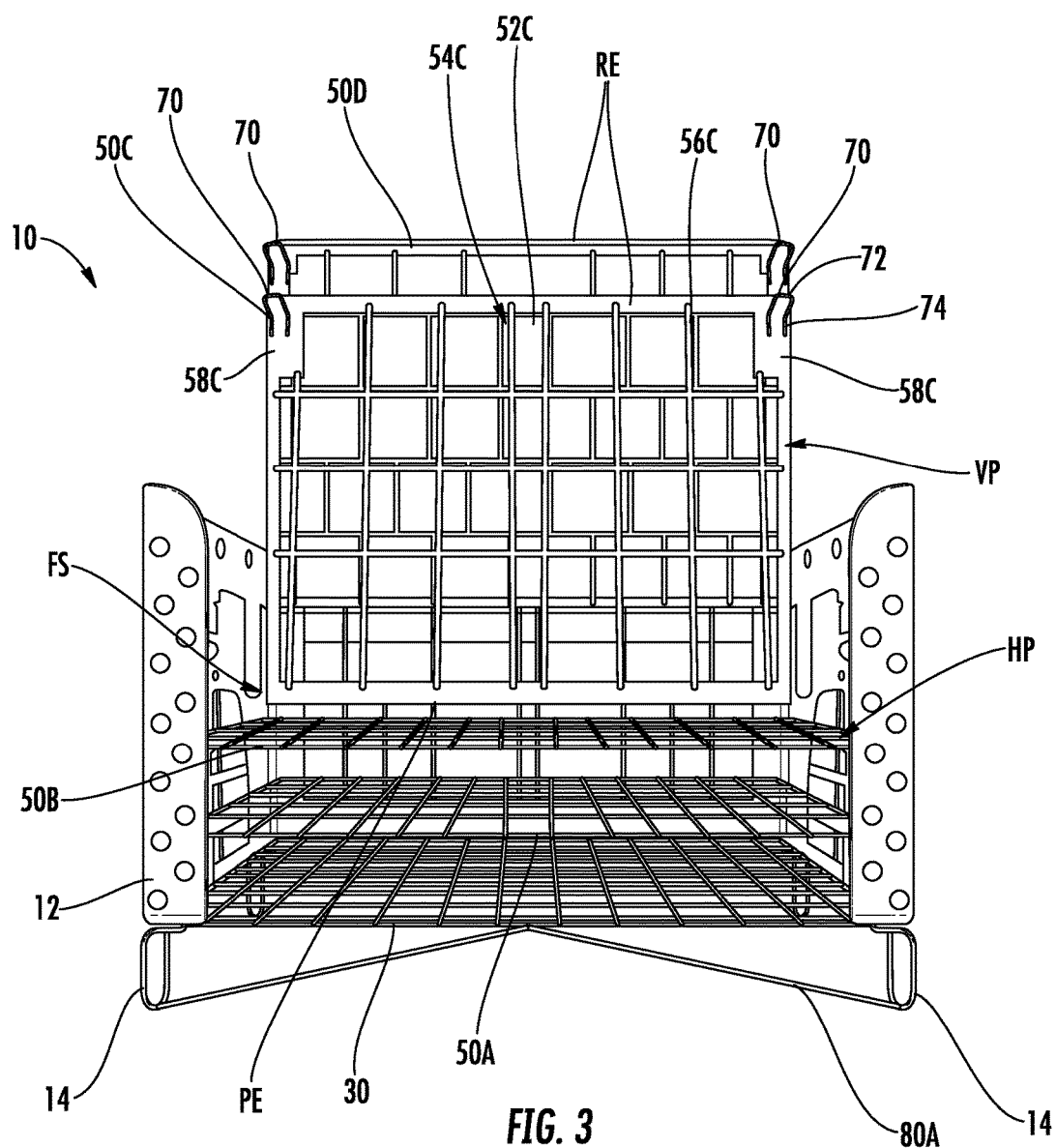
FIG. 3 illustrates another front plan view of the embodiment of the basket apparatus for use in food preparation with embodiments of two upper shelves in vertical positions according to FIG. 1A.

Reference will now be made in detail to the description of the present subject matter, one or more examples of which are shown in the figures. Each example is provided to explain the subject matter and not as a limitation. In fact, features illustrated or described as part of one embodiment may be used in another embodiment to yield still a further embodiment. It is intended that the present subject matter cover such modifications and variations.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

In the present disclosure, when a feature, position, element, component, region, layer and/or section is being described as "top," "bottom," "vertical," "horizontal," "upper," "lower," "front," "rear," "side," etc., it should be understood that such terms are relative and not absolute. Thus, something that is described with the adjective of "top" may also be considered on a side or a bottom depending on the orientation of the larger subject being described. Additionally, when a feature, element, component, region, layer and/or section is being described as "under," "on," or "over" another feature, element, component, region, layer and/or section, it is to be understood that the features, elements, components, regions, layers and/or sections can either be directly contacting each other or have another feature, element, component, region, layer and/or section between the them, unless expressly stated to the contrary. Similarly, directional movement, such as "back and forth," "forward," "backward," "up," "down," or the like are to be understood as relative descriptions that can change depending on the orientation of the subject matter relative to the viewer. Thus, these terms are simply describing the relative position of the features, elements, components, regions, layers and/or sections to each other and do not necessarily mean an absolute position or direction since the relative position above or below depends upon the orientation of the subject matter to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of a basket apparatus and are not intended to limit the scope of the subject matter disclosed herein.

A "base sheet" as used herein means a single, unitary sheet of hard, rigid material that can be manipulated, for example but not limited to, being cut, stamped, bent, and/or molded, into and hold a desired shape for use as, or in, a cooking apparatus that can withstand use within intended cooking conditions, for example, the temperatures and/or the pressures of the intended cooking process in which the cooking apparatus that comprises a base sheet is to be used.

Base sheets can comprise two opposing generally flat surfaces before the manipulation into the desired shape. As an example, base sheets can comprise, but are not limited to sheets of metal or metal alloys. For example, the sheets of metal or metal alloys can be, but are not limited to, aluminum, aluminum alloys, titanium, titanium alloys, copper, copper alloys, steel, steel alloys, and stainless steels.

The basket apparatuses for use in preparation of food products and their configurations as disclosed herein can be more sturdy that conventional wire baskets. For example, traditional weak points of conventional wire baskets have been addressed or eliminated to permit the basket apparatuses to better withstand the conditions and environments in which such baskets are used. As an example, wire connection points, such as welds between overlapping wires, and handle connection points can be improved or eliminated. For example, using flat sheet material, such as flat sheets of an appropriate metal or metal alloy, as a base material instead of metal wire, which usually has a rounded shape, as the base material can decrease and, or eliminate connection points within walls of the basket apparatuses and can permit stronger and/or sturdier connections between wall sections and/or a handle or handle apparatus. For example, each wall section and/or shelf can comprise a single, unitary piece of a base sheet material, such as a metal or metal alloy, that can be stamped to cut desired and/or appropriate openings within each sheet depending on the use of the base sheet within the basket apparatus. Thereby, connection points such as welds within a given wall or shelf of the basket apparatus can be at least decreased, if not eliminated. For example, by decreasing or eliminating welds within a given wall or shelf, the likelihood of failure of at similar or corresponding points within unitary sheet of material can be reduced.

The basket apparatuses disclosed herein can comprise one or more legs with duel supports. The basket apparatuses can comprise upper level shelf legs can be configured to be smaller and can be configured to give the shelf a stronger support for alignment with a next lower shelf when the shelves are lowered to their horizontal positions. Shelves can be spaced equally to increase the uniformity of heated fluid flow around the food products placed on the shelves and increase the likelihood that food products placed on the respective shelves can be cooked equally. A platform on the upper surface to each shelf can be provided that spacer legs of the adjacent upper shelf can rest. In some embodiments, the basket apparatuses can be configured so that the shelves interact with each other in the upward position until product is loaded in basket apparatuses.

For example, the base sheet material used to construct the walls and shelves of the basket apparatus can a metal or metal alloy. For example, the base sheet material can comprise, but is not limited to, a stainless steel base sheet. In some embodiments, such stainless steel base sheets can comprise brushed stainless steel, which can, in some instances, reduce the opportunity for oxidation, such as rust, to occur. In some embodiments, such stainless steel base sheets can comprise polished stainless steel. The base sheet material can comprise a thickness that facilitates the maintenance of the integrity of the base sheet material after the cutting of the apertures therein and subsequent use to decrease the deterioration and warping of the walls and shelves. In some embodiments, the base sheet can comprise between about a 10 gage and about 20 gage thickness. For example, in some embodiments, the base sheet can comprise about a 14 gage or about a 16 gage thickness.

Apertures can be cut into and through the base sheet material to provide openings to promote circulation of heated fluid, such as, for example, cooking oil. The apertures can be cut a distances far enough away from one another to help ensure integrity of a given wall or shelf. The width of the interconnecting tab portions of remaining base sheet material that form a lattice-like portion of the base sheet can be such that the interconnecting tab portions provide a general flat surface on within each tab portion and across the lattice-like portion of the wall or shelf between the apertures. The apertures can be arranged in a pattern that promotes connection of walls to one another and connection of handle apparatuses and legs to the walls and/or shelves. In particular, lattice-like formations left after the cutting of the apertures can be of a desired size to permit one or more connection lines (such as for example, solder lines) or a plurality of connection points (such as for example, solder points) to be formed between each given base sheet and the component or other base sheet being attached thereto. For example, weld lines can be longer than a weld point normally seen between individual wires of conventional wire baskets. Alternative, a number of weld lines or weld points can be provided between each integral, unitary base sheet that forms walls, or between an integral, unitary base sheet and a component such as a leg or a handle apparatus as compared to a single weld point between respective wires or between each wire and a respective component. Thus, strategic surface areas for sturdier connections of components to walls and shelves can be provided. In some embodiments, the apertures cut into the walls of the basket apparatuses can generally be equally spaced apart so that interconnecting tab portions of the lattice-like portions of the walls can comprise an equal width to allow for more strength stability across the respective walls. The shelves with appropriate apertures cut therethrough and appropriate lattice-like portions formed so that the shelves have a generally flat surface can thus be configured to leave minimal grill marks on food products being cooked in the basket apparatus. In some embodiments, the shelves can comprise spacer connection portions that are differently shaped or sized as compared to the interacting tab portions of the lattice-like portions in the shelves.

By having handle connection portions formed on an appropriate side wall configured for connecting the handle apparatus thereto, a stronger attachment of the handle apparatus to the basket apparatus can be made. For example, in some embodiments, the basket apparatuses can comprise handle apparatuses that comprise two piece units as compared to three piece units used on conventional wire baskets. Similarly, by having hanger connection portions formed on an appropriate side wall configured for connecting a basket hanger, a stronger and more secure attachment of the basket hanger to the basket apparatus can be made.

In some embodiments, a bottom outside wall can form the bottom shelf of the basket apparatus. In some embodiments, the bottom shelf can comprise a thicker gauge base sheet as compared to other shelves. In some embodiments, the bottom shelf can comprise a base sheet having one or more different aperture shapes or sizes as compared to the other shelves. In some embodiments, the bottom shelf can comprise that are differently shaped or sized as compared to the interacting tab portions of the lattice-like portions in the shelves. In some embodiments, the bottom shelf can comprise basket leg connection portions that can form a platform and can be about double the width of the interconnecting tab portions of the lattice-like portions.

In some embodiments, the basket apparatus can comprise side walls that comprise different base sheets that can be secured together. In some embodiments, the basket apparatus can comprise a single unitary base sheet that can comprise two or more side walls. For example, a single, unitary base sheet can be stamped to form appropriate apertures for respective side walls and the single unitary base sheet can be bent along one or more appropriate lines and at appropriate angles or curvatures to form the two or more side walls. In some embodiments, the bent or curved portions that can be used to differentiate between different side walls can comprise an integral surface area with no apertures cut therethrough. In some embodiments, a single, unitary base sheet can be bent to comprise three side walls. In some embodiments, a single, unitary base sheet can be bent to comprise three side walls and at least a portion of a four side wall.

Thus, the configuration of basket apparatuses and the base sheet materials that can be used therein can help the structural integrity of the basket apparatuses to decrease structural damage such as warping and connection point failures and, thus, increase the life of the basket apparatuses with less need for repair and downtime.

Referring to the Figures in greater detail, an embodiment of a basket apparatus, generally designated 10, is shown in FIGS. 1A-4. Basket apparatus 10 can be used for holding food products in a food cooking apparatus that can use a heated fluid to heat and cook the food products. For example, the basket apparatus 10 can be used to hold food products in a deep frying apparatus having a reservoir of cooking oil. Basket apparatus 10 can generally comprise one or more base sheets that form side walls 20A, 20B, 20C and a bottom wall 30 that forms a basket frame, generally designated 12, and a plurality of stackable shelves, generally designated 50A, 50B, 50C, 50D. The stackable shelves 50A, 50B 50C, 50D can be pivotally attached to opposing side walls 20A, 20B, 20C so that the stackable shelves 50A, 50B, 50C, 50D are movable between stackable horizontal positions and stackable vertical positions. The basket frame 12 can have frame legs 14 that support frame 12 when the basket apparatus 10 is placed within a cooking apparatus. Basket legs 14 can create separation space that allows heated fluid to be flowable therethrough. To help reinforce the legs 14, the basket apparatus 10 can also comprise supports 16 that can be attached to the legs 14 and the bottom wall 30. Basket apparatus 10 can also comprise a handle apparatus 60 for facilitating the lowering of the basket apparatus 10 into a reservoir of heated fluid to cook the food products and the lifting of the basket apparatus 10 out of the heated fluid to allow the food products to drain. As shown in FIGS. 8A-8C, the handle apparatus 60 can comprise one or more handle holder brackets 62 that can be on one or more side walls 20A, 20C. Basket apparatus 10 can further comprise a basket hanger 18 (see for instance, FIGS. 6 and 7) that can be attached to a back side wall 20B to hang the basket apparatus 10 outside the heated fluid to facilitate the draining of the heated fluid from the food products.

Each base sheet that forms the side walls 20A, 20B, 20C can have apertures 22A, 22B, 22C therein and can form unitary side wall lattice-like portions 24A, 24B, 24C between and around the apertures 22A, 22B, 22C. In particular, the unitary side wall lattice-like portions 24A, 24B, 24C can comprise interconnecting tab portions 26. Similarly, each stackable shelf 50A, 50B, 50C, 50D can comprise base sheets that can be cut to have apertures 52A, 52B, 52C, 52D therein and form unitary shelf lattice-like portions 54A, 54B, 54C, 54D of interconnecting tab portions 56 of around the apertures 52A, 52B, 52C, 52D. A base sheet that can form the bottom wall 30 which can also be considered a bottom shelf can have also have unitary bottom wall lattice-like portions 34 of interconnecting tab portions 36 that can have apertures 32 therebetween. The base sheets used to form the side walls 20A, 20B, 20C, bottom wall 30, and shelves 50A, 50B, 50C, 50D of the basket apparatus 10 can have two flat opposing surfaces in the lattice-like portions can be cut. As stated above, the base sheets can comprise sheets of metals or metal alloys. For example, the base sheets can be sheets of stainless steel of appropriate gage or thickness.

For example, the basket apparatus 10 for use in preparation of food products shown in FIGS. 1A-5A and 6-8C can comprise a plurality of side walls 20A, 20B, 20C that can be formed by one or more base sheets forming unitary side wall lattice-like portions 24A, 24B, 24C that can have respective apertures 22A, 22B, 22C therein. The one or more base sheets can also form side wall component connection portions 28A, 28B, 28C. The unitary side wall lattice-like portions 24A, 24B, 24C can comprise substantially flat surfaces 24S. Similarly, the component connection portions 28A, 28B, 28C can also comprise substantially flat surfaces 28S. The bottom wall 30 can comprise a base sheet forming a unitary bottom wall lattice-like portion 34 having apertures 32 therein and forming bottom wall component connection portions 36. The bottom wall lattice-like portion 34 and the bottom wall component connection portions 36 can comprise generally flat surfaces 34S and 36S. By being having the surfaces 34S and 36S on the bottom wall lattice-like portion 34 and the bottom wall component connection portions 36, the bottom wall 30 can thus be configured to leave minimal grill marks on food products being cooked in the basket apparatus 10.

The bottom wall 30 can be securely attached to the side walls 20A, 20B, 20C to define a food product receiving space FS. The plurality of shelves 50A, 50B, 50C, 50D can be disposed within the food product receiving space FS. Each shelf 50A, 50B, 50C, 50D can have a pivot end side PE and a raising end side RE. Further, each shelf 50A, 50B, 50C, 50D can be pivotally connected to opposing side walls 20A, 20C proximal to the pivot end side PE and pivotally movable between a stackable horizontal position HP (see FIGS. 1A, 1B and 3) and a stackable vertical position VP (see FIGS. 3 and 4) in the food product receiving space FS formed by the side walls 20A, 20B, 20C and bottom wall 30. The bottom wall 30 can thus be considered a fixed shelf for food products above which the pivotably movable plurality of shelves 50A, 50B, 50C, 50D are stackable in the horizontal positions HP within the food product receiving space FS. Each shelf 50A, 50B, 50C, 50D can comprise a base sheet forming a unitary shelf lattice-like portion 54A, 54B, 54C, 54D having apertures 52A, 52B, 52C, 52D therein forming substantially flat surfaces 54S on which food products can be placed. Each base sheet also can comprise component connection portions 58A, 58B, 58C, 58D with generally flat surfaces 58S.

Referring back to FIGS. 1A-5A, in some embodiments, the side walls 20A, 20B, 20C can comprise a single unitary base sheet that forms two or more of side walls. As an example, the single unitary base sheet can be bent to form corners 25A, 25B, 25C, and 25D where the respective side walls 20A, 20B, 20C converge. For example, the single unitary base sheet can be bent to form a back side wall 20B and two opposing side walls 20A, 20C and corner portions 25C, 25D that can comprise a front end side wall portion 20D. In some embodiments, each side wall 20A, 20B, 20C can comprise a separate base sheet can that be secured together, for example, by welding.

The apertures 22A, 22B, 22C in the side walls 20A, 20B, 20C, the apertures 32 in the bottom wall 30, and the apertures 52A, 52B, 52C, 52D in the shelves 50A, 50B, 50C, 50D can facilitate flow of the heated cooking fluid in a cooking apparatus, such as a cooking oil in a deep fryer, through the basket apparatus placed in the cooking apparatus to more evenly and thoroughly cook food products placed therein. As shown in FIGS. 1A-5A, the one or more base sheets that can form the side walls 20A, 20C can have additional flow apertures 40 therein that further help to increase or promote the heated cooking fluid through the basket apparatus 10. Similar flow apertures can also be added to back side wall 20B and front side wall portion 20D. The additional flow apertures 40 in the single unitary base sheet can comprise at least one of a different size or different shape from the apertures 22A, 22B, 22C within the lattice-like portions 24A, 24B, 24C of the one or more base sheets.

Thereby, in some embodiments, the single unitary base sheet forms a back side wall 20B and two opposing side walls 20A, 2C and corner portions 25C and 25D that can comprise a front end side wall portion 20D. The single unitary base sheet can have additional flow apertures 40 therein that comprise at least one of a different size or different shape from the apertures 22A, 22B, 22C within the lattice-like portions 24A, 24B, 24C of the of the single unitary base sheet. The additional flow apertures 40 can also be in the front end side wall portion 20D and in side portions, such as an upper side portion and a back side portion, of the two opposing side walls 20A, 20C. In some embodiments, the unitary side wall lattice-like portions 22A, 22C of the two opposing side walls 20A, 20C include one or more end apertures that comprise a different shape such as a curves side in the aperture nearest the handle holder bracket 62. The unitary side wall lattice-like portions 24A, 24C of the two opposing side walls 20A, 20C mirror one another.

Figure 7:
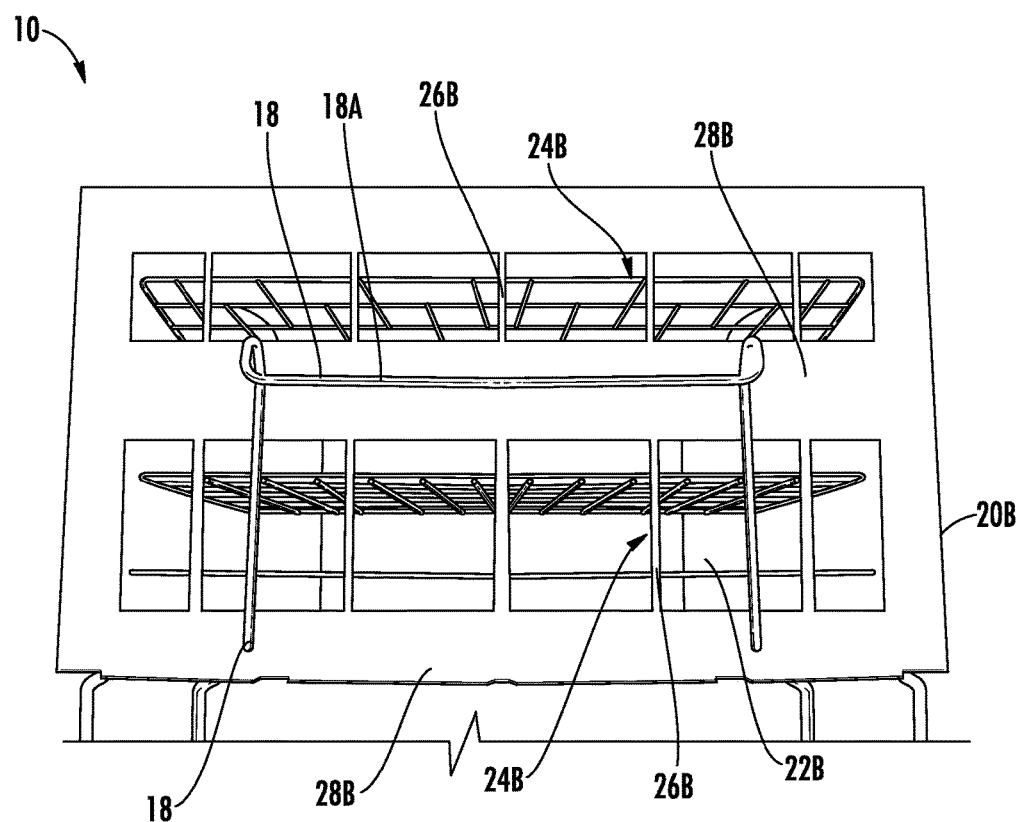
FIG. 7 illustrates a back side plan view of the embodiment of the basket apparatus for use in food preparation according to FIG. 1A.
Figure 8A:
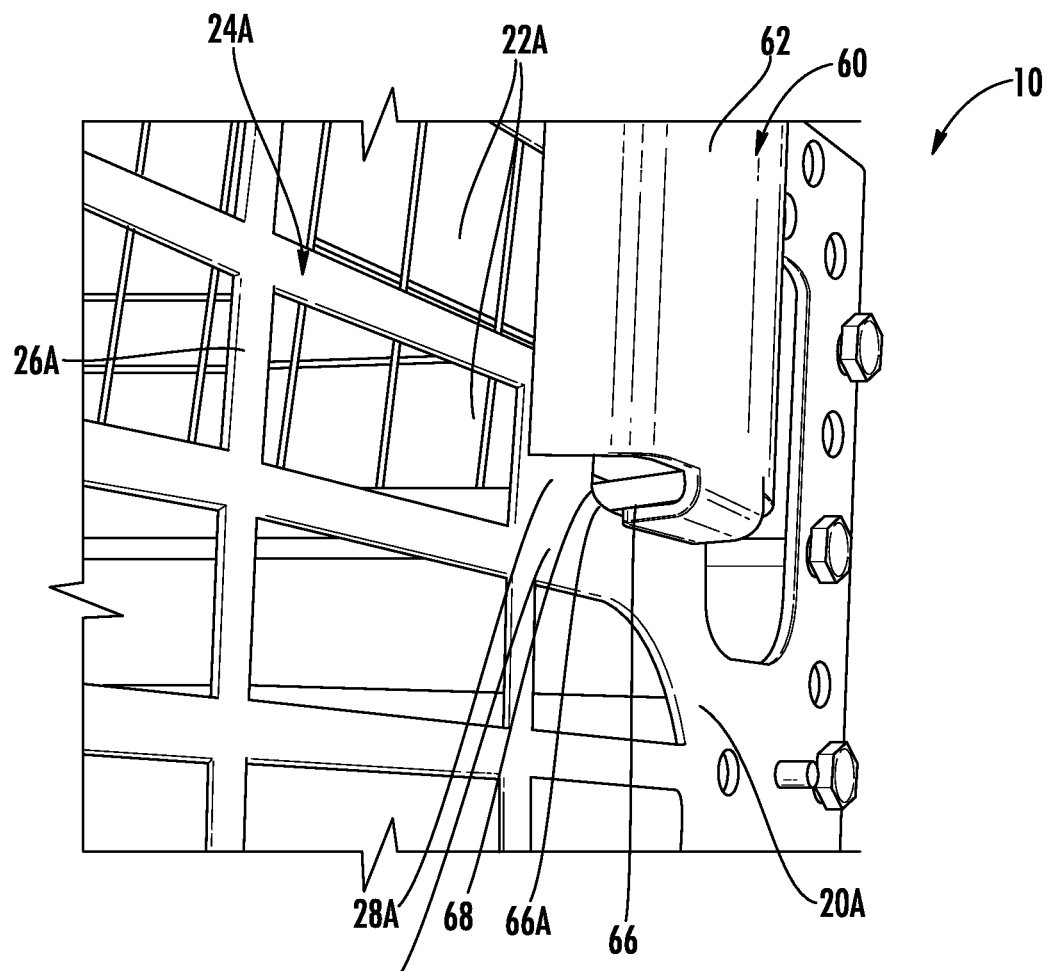
FIGS. 8A-8C illustrate perspective views of the embodiment of the basket apparatus for use in food preparation according to FIG. 1A showing aspects of an embodiment of hand apparatus according to the subject matter disclosed herein.
Figure 8B:
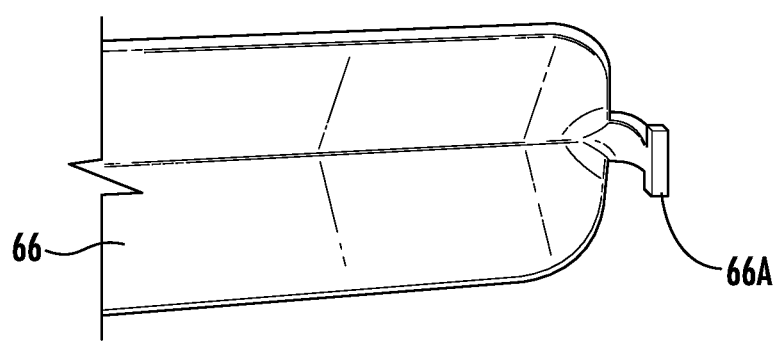
Figure 8C:
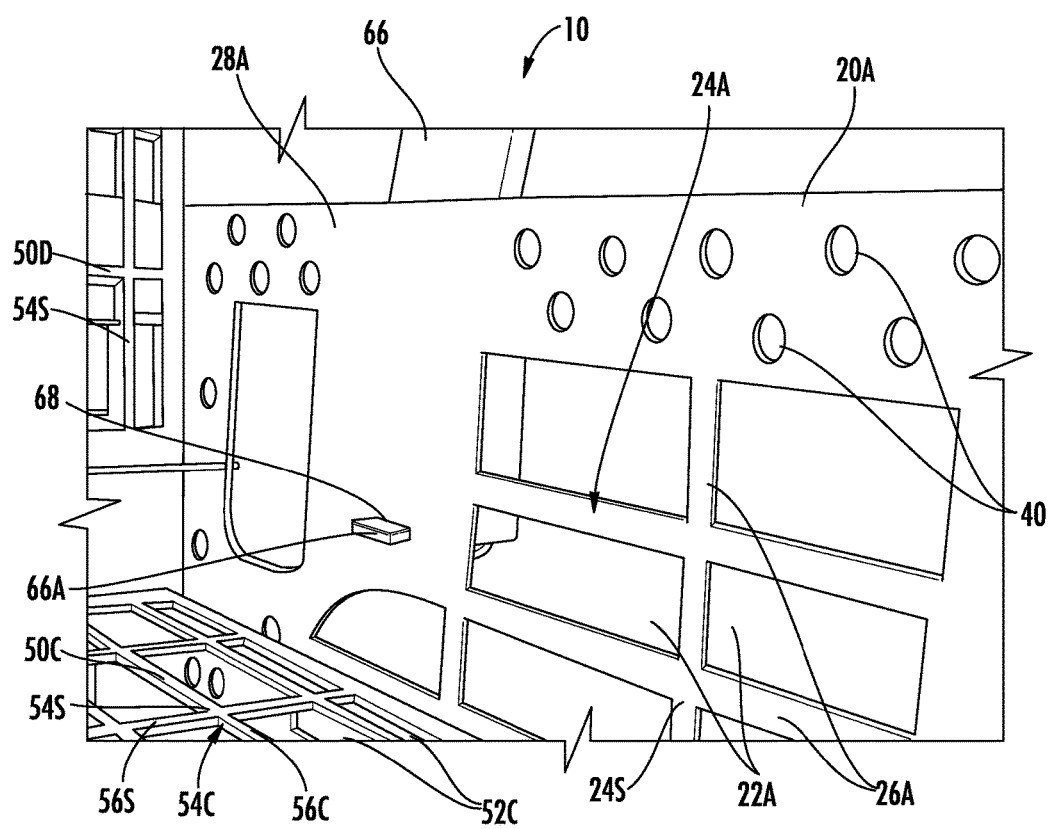

In some embodiments as shown in FIG. 7, the unitary lattice-like portions 24B of the back side wall 20B can comprise a different structure from the unitary lattice-like portions 24A, 24C of the two opposing side walls 20A, 20C. For example, the unitary lattice-like portions 24B of the back side wall 20B comprise an upper unitary lattice-like portion 24B and a lower unitary lattice-like portion 24B. As shown in FIG. 7, the upper unitary lattice-like portion 24B and the lower unitary lattice-like portion 24B can each have a single row of apertures 22B, such as rectangular apertures.

As discussed above, the unitary lattice-like portions 24A, 24B, 24C of the plurality of sidewalls 20A, 20B, 20C can comprise interconnecting tab portions 26A, 26B, 26C that can have substantially flat surfaces and can have widths that are approximately the same. Similarly, the unitary lattice-like portions 34 of the plurality of sidewalls 30 and the unitary lattice-like portions 54A, 54B, 54C, 54D of the plurality of shelves 50A, 50B, 50C, 50D can each comprise respective interconnecting tab portions 38 or 56A, 56B, 56C, 56D that can have substantially flat surfaces and widths that are approximately the same.

Generally and depending on the component being secured thereto, the component connection portions 28A, 28B, 28C of the side walls 20A, 20B, 20C can be larger than the interconnecting tab portions 26A, 26B, 26C of the side walls 20A, 20B, 20C. Also, the component connection portions 36 of the bottom wall 30 can be larger than the interconnecting tab portions 38 of the bottom wall 30. Similarly, the component connection portions 58A, 58B, 58C, 58D of the shelves 50A, 50B, 50C, 50D can be larger than the interconnecting tab portions 56A, 56B, 56C, 56D of the shelves 50A, 50B, 50C, 50D. Thus, the surface areas of the generally flat surfaces of the component connection portions of the plurality of sidewalls, the bottom wall, and the shelves can be greater in size than surface areas of the generally flat surfaces of the interconnecting tab portions of the respective walls and shelves. Thereby, widths and/or surface areas of different and specific portions of the walls and shelves of the basket apparatus 10 can be varied or different from other portions the respective walls and shelves while maintaining an approximately flat surface of the respect walls and shelves. Thus, by using base sheets to cut apertures therein and/or bent to form the frame 14 of the basket apparatus 10, a flexibility and strength is introduced into the design of the basket apparatus 10. In particular, once a cooking apparatus in which a basket apparatus 10 can be used is identified, the placement of apertures to enhance the flow of heated cooking fluid therein and placement and size of different component connections portions can be selected and matched to optimize the strength and durability of the basket apparatus while decrease any adverse effects in the cooking of the intended food products therein due to the creation of undesirable surface variations in the surfaces that can come in contact with the food products being cooked.

Figure 5A:
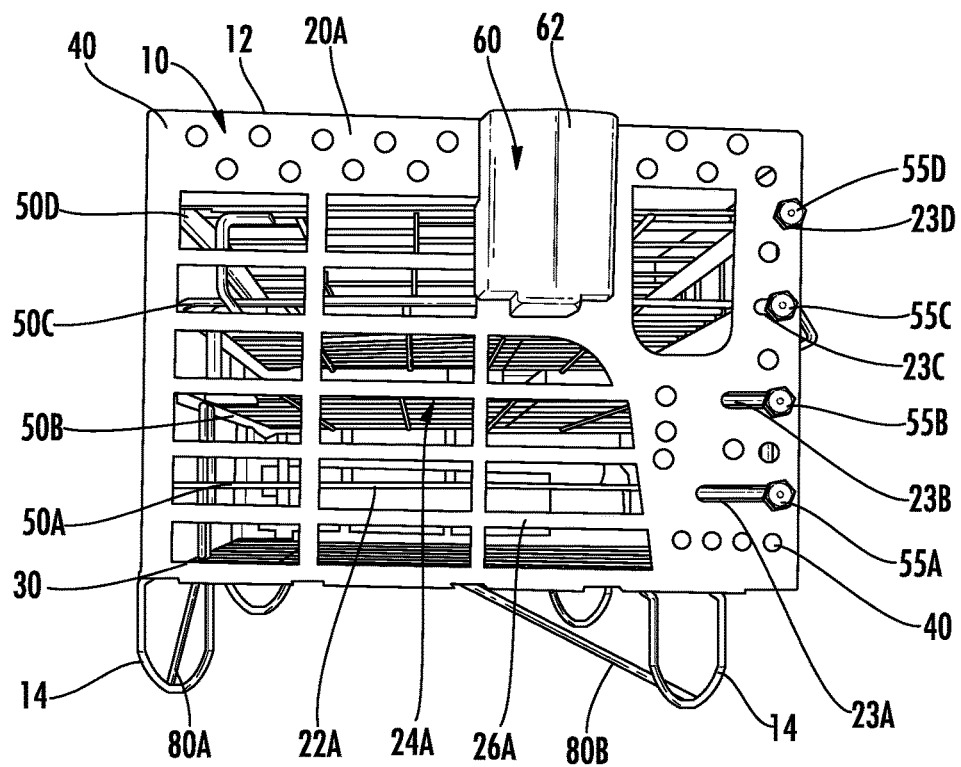
FIG. 5A illustrates a side plan view of the embodiment of the basket apparatus for use in food preparation according to FIG. 1A.

Each shelf 50A, 50B, 50C, 50D can comprise hinge members 55A, 55B, 55C, 55D pivotally connected to the opposing side walls 20A, 20C proximal to the pivot end side PE. In some embodiments as shown in FIG. 5A, each opposing side wall 20A, 20C can have a plurality of horizontal slots 23A, 23B and 23C of different sizes. Slots 23A can be in line with the bottom pivotal shelf 50A and pivotally engaged by hinge members 55A. Slots 23B can be in line with the pivotal shelf 50B immediately above the bottom pivotal shelf 50A. Slots 23B can be pivotally engaged by hinge members 55B. Similarly, slots 23C can be in line with the next stacked shelf 50C and can be pivotally engaged by hinge member 55C. Further, hinge members 55D can pivotally engage the opposing side walls 20A, 20C at fixed positions 23D. The slots 23A, 23B and 23C and fixed position 23D can be an equidistance from its respective adjacent slots so that the hinge members 55A, 55B, 55C, 55D can held in vertical positions to facilitate the creation approximately constant vertical spaces between adjacent shelves 50A, 50B, 50C, 50D when the shelves 50A, 50B, 50C, 50D are in the horizontal positions HP.

Referring to FIGS. 1-4, the pivotal shelves 50A, 50B, 50C, 50D can be pivoted about the respective hinge members 55A, 55B, 55C, 55D between their stackable horizontal positions HP in which the food products can be placed on the shelves 50A, 50B, 50C, 50D and cooked and their stackable vertical positions VP that permits loading and unloading of the shelves 50A, 50B, 50C, 50D. In the embodiment shown in FIG. 5A, the very top shelf 50D can simply pivot upwardly about hinge member 55D. As the other shelves 50A, 50B, 50C are pivoted up, the hinge members 55A, 55B, 55C can slide in their respective slots 23A, 23B and 23C to positions shown in FIG. 4. This movement can allow the rear edges of the shelves 50A, 50B, 50C to move forwardly so that the shelves can clear the previously raised shelves. The varied lengths of slots 23A, 23B and 23C can facilitate the clearance of the lower shelves past upper shelves as the shelves are progressively pivoted upwardly.

Figure 5B:
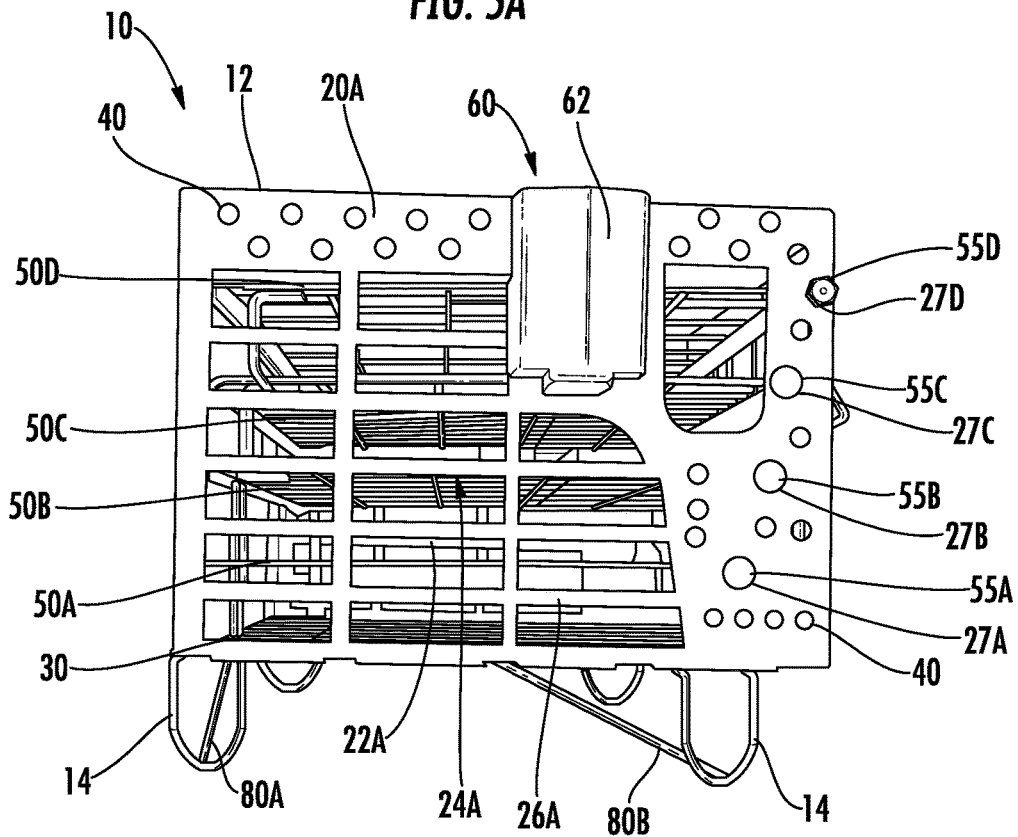
FIG. 5B illustrates a side plan view of another embodiment of a basket apparatus for use in food preparation according to the subject matter disclosed herein.

As shown in FIG. 5B, in some embodiments, the hinge members 55A, 55B, 55C, 55D for each successive shelf can be held at fixed pivotal positions that are at an equidistance from the adjacent hinge members 50A, 50B, 50C, 50D for the respective shelf 50A, 50B, 50C, 50D below so that an approximately constant vertical space created between adjacent shelves 50A, 50B, 50C, 50D when the shelves 50A, 50B, 50C, 50D are in the horizontal positions. The hinge members 55A, 55B, 55C, 55D of the shelves 50A, 50B, 50C, 50D shown in FIG. 5B, in however, can be rotatable, or pivotably, secured at fixed positions 27A, 27B, 27C, 27D on two opposing side walls 20A, 20C proximal to the back side wall 20B. The fixed positions 27A, 27B, 27C, 27D can be staggered. For example, the fixed positions 27A, 27B, 27C, 27D can be staggered from the fixed positions 27D closest to corners between the opposing side walls 20A, 20C and the back side wall 20B for the hinge members 55D of an upper positioned shelf 50D to the fixed positions 27A that are farthest from the corners between the opposing side walls 20A, 20C and the back side wall 20B for the hinge members 55A of the lowest positioned pivotal shelf 50A to facilitate the stackability of the plurality of shelves 50A, 50B, 50C, 50D.

As discussed above, one or more of the side walls, such as opposing side walls 20A, 20C, can comprise handle connection portions 28A, 28C configured to provide a surface area that permits the attachment of a handle apparatus 60 to the respective handle connection portions 28A, 28C as shown in FIGS. 8A-8G. The handle apparatus 60 can comprise handle holder brackets 62 secured to the handle connection portions 28A, 28C to form respective holding cavities 64 between the respective handle holder brackets 62 and handle connection portions 28A, 28C. The handle apparatus 60 can additionally comprise a handle 66 having a hook end 66A. The handle connection portions 28A, 28C can have hook receiving slots 68 therein within the respective holding cavities 64. Each hook receiving slot 68 can be configured to permit the insertion of the hook end 66A of the handle 66 into the hook receiving slot 68 so that the basket apparatus 10 can be lifted by the handle 66. With two opposing side walls 20A, 20C, the handle apparatus 60 can comprise opposing handle holder brackets 62 secured respectively to the opposing handle connection portions 28A, 28C with opposing holding cavities 64 between the respective handle holder brackets 62 and handle connection portions 28A, 28B. The handle 66 of the handle apparatus 60 can have two hook ends 66 with each hook end 66 capable of being inserted into the hook receiving slots 68 so that the handle can be connected to opposing side walls 20A, 20C and the basket apparatus 10 can be lifted by the handle 66.

As shown in FIG. 7 and discussed above, the basket apparatus 10 can comprise a basket hanger 18 that can be connected to the back side wall 20B. In particular, the basket hanger 18 can be secured to at least one hanger connection portion 28B. For example, the at least one hanger connection portion 28B can comprise an upper hanger connection portion 28B and a lower hanger connection portion 28B as shown in FIG. 7. An upper lattice-like portion 24B can reside above the upper hanger connection portion 28B and a lower lattice-like portion 24B can be positioned between the upper hanger connection portion 28B and the lower hanger connection portion 28B. The basket hanger 18 can comprise an extended attachment 18A to both the upper hanger connection portion 28B and the lower hanger connection portion 28B. As can be seen, the upper hanger connection portion 28B and the lower hanger connection portion 28B can have vastly larger surface areas than tab portions 26B of lower lattice-like portions 24B.

The basket apparatus 10 can comprise a plurality of basket legs 14 as stated above that can be connected to the bottom wall 30. The component connection portions 36 of the bottom wall 30 can comprise a plurality of leg connection portions. The leg connection portions 36 can correspond to the plurality of basket legs 14. The leg connection portions 36 can be such a size and shape so as to permit an attachment base of each bracket leg 14 to entirely fit on and be attached to the corresponding leg connection portion 36.

Each leg connection portion 36 can form on its opposite side respective spacer platforms 36A on which spacer legs 70 of the shelf 50A adjacent the bottom wall 30 can reside when the shelf 50A is in a horizontal position. The spacer platforms 36A can be on one a side of the leg connection portions 36 opposite a side 36B on which the respective basket legs 14 are attached. The spacer legs 70 and the surface of the spacer platforms 36A can be configured entire footprint of a bottom 72 of each spacer leg 70 of the shelf 50A adjacent the bottom wall 30 can reside on the respective spacer platform 36A.

Figure 6:
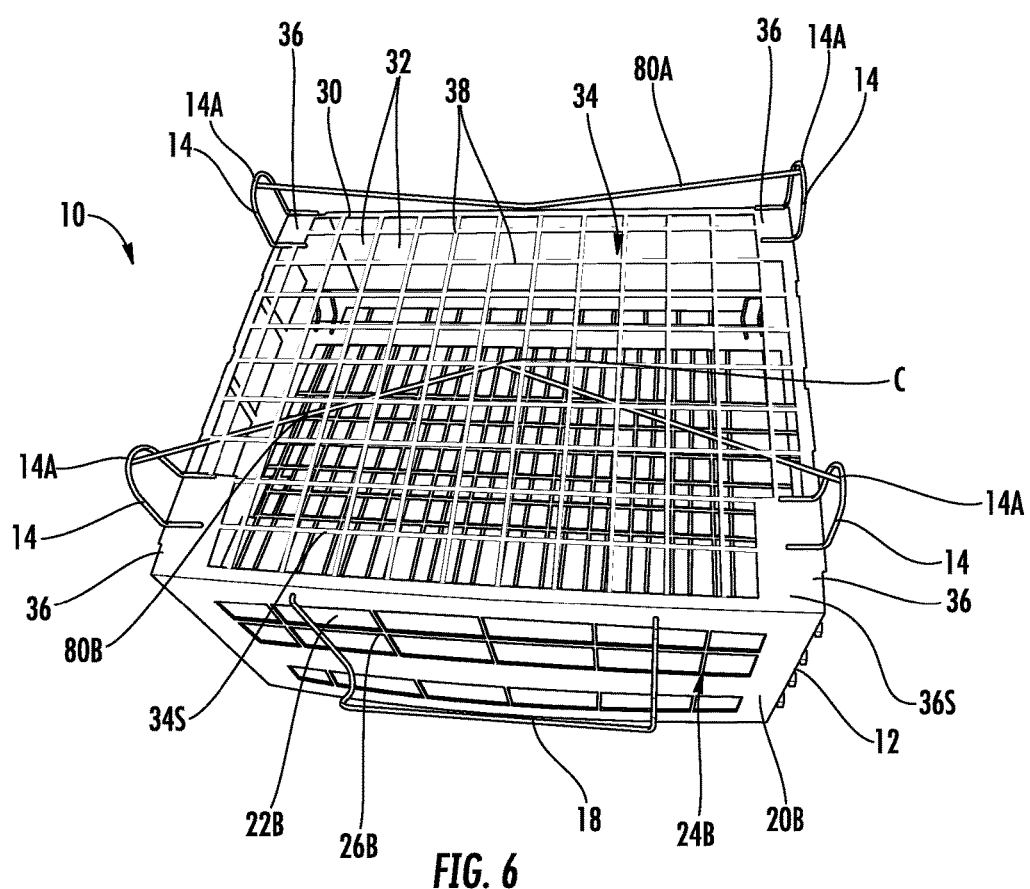
FIG. 6 illustrates a bottom perspective view of the embodiment of the basket apparatus for use in food preparation according to FIG. 1A.

Referring to FIG. 6, the plurality of basket legs 14 can comprise front basket legs 14 and back basket legs 14. The front basket legs 14 can have a front support 80A connected to each front basket leg 14 and to the bottom wall 30. The back basket legs 14 can have a back support 80B connected to each back basket leg 14 and to the bottom wall 30. In some embodiments, the back support 80B can be connected, or secured, to the back basket legs 14 proximal a foot end of 14A the back basket legs 14 with the back support 80B being angled from each back basket leg 14 toward a center portion C of the bottom wall 30 to which the back support 80B is connected.

As shown in FIGS. 1A-4, each shelf of the plurality of shelves 50A, 50B, 50C, 50D can further comprise one or more spacer legs 70 that can be connected to one or more spacer connection portions 58A, 58B, 58C, 58D of the respective shelves 50A, 50B, 50C, 50D. For example, two spacer legs 70 can be secured to two corresponding spacer connection portions 58A, 58B, 58C, 58D. The spacer legs 70 and the spacer connection portions 58A, 58B, 58C, 58D can be configured so that each spacer leg 70 can have an attachment base 74 that can have a surface that fits entirely on and be attached to a first side of the corresponding spacer connection portion 58A, 58B, 58C, 58D. The spacer connection portions 58A, 58B, 58C, 58D can be positioned of the respective shelves 50A, 50B, 50C, 50D proximal to the raising end sides RE. Each of the spacers connection portions 58A, 58B, 58C, 58D on each shelf 50A, 50B, 50C, 50D can thus have a first side to which the attachment base 74 of the corresponding spacer leg 70 is attached and an opposing second side that forms a respective spacer platform 57A, 57B, 57C on which a spacer leg 74 of the respective upper adjacent shelf 50A, 50B, 50C, 50D can reside when the shelves 50A, 50B, 50C, 50D are in the horizontal positions HP. An entire footprint of a bottom 72 of each spacer leg 74 of the respective upper adjacent shelf 50A, 50B, 50C, 50D can reside on the respective spacer platform 57A, 57B, 57C of the respective lower adjacent shelf 50A, 50B, 50C, 50D when the shelves 50A, 50B, 50C, 50D are in the horizontal positions HP. The spacer legs 70 secured to the shelves 50A, 50B, 50C, 50D can vertically align with corresponding spacer legs 70 of adjacent shelves 50A, 50B, 50C, 50D and corresponding baskets legs 14 secured to the bottom wall 30.

Figure 4:
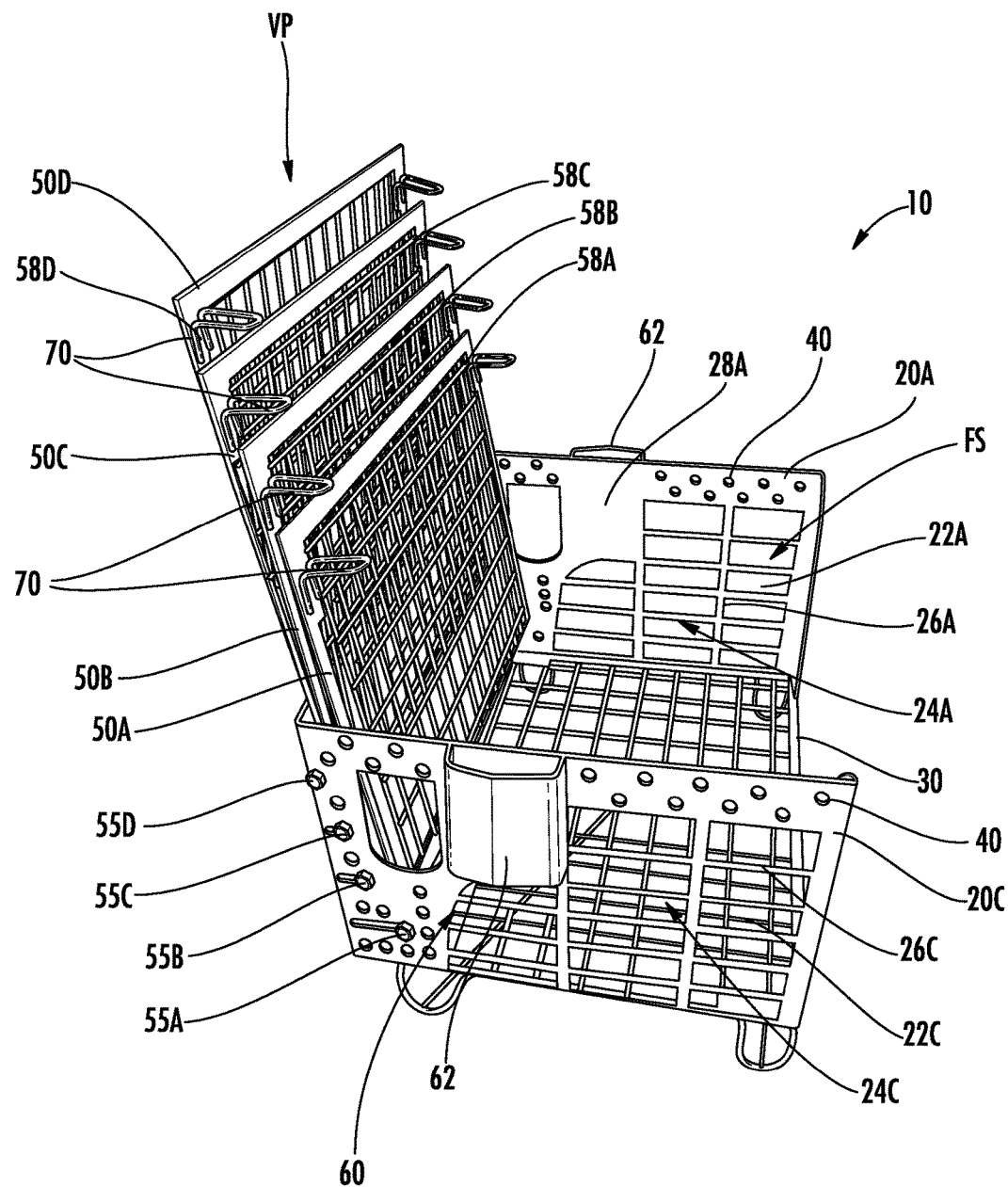
FIG. 4 illustrates a top perspective view of the embodiment of the basket apparatus for use in food preparation with embodiments of shelves in vertical positions according to FIG. 1A.

In operation, the basket apparatus 10 can be loaded by first pivoting all shelves 50A, 50B, 50C, 50D upwardly to their generally vertical positions VP. All of the shelves 50A, 50B, 50C, 50D can be pivoted upwardly simply by lifting on the bottom shelf 50A. The shelves 50A, 50B, 50C, 50D remain in their upper or loading positions as shown in FIG. 4 because the shelves 50A, 50B, 50C, 50D can be move "over-center" of the pivotable hinge members 55A, 55B, 55C, 58D. Food products, such as chicken filets, can be easily and neatly arranged on top of the bottom wall 30 of the basket apparatus 10. After the bottom wall is loaded with the food products, the bottom shelf 50A can be lowered to its horizontal position HP spacer legs 70 of the bottom shelf 50A resting on the spacer platform 57A of the spacer connection portion 36A of the bottom wall 30. Each subsequent shelf bottom shelf can be easily loaded with the food products in similar fashion. The procedure can be continued until all of the shelves are sequentially lowered and loaded with food products, whereupon the entire loaded basket apparatus can be lowered into the reservoir of heated cooking fluid in a cooking apparatus.

Embodiments of the present disclosure shown in the Figures and described above are exemplary of numerous embodiments that can be made within the scope of the present subject matter. It is contemplated that the configurations of the basket apparatuses for use in preparation of food products can comprise numerous configurations other than those specifically disclosed. Thus, the scope of the present subject matter in this disclosure and the appended claims should be interpreted broadly.

What is claimed is:

1. A basket apparatus for use in a cooking process of food products in a deep frying apparatus, the basket apparatus comprising:

a plurality of side walls comprising one or more base sheets comprising at least one of a metal or metal alloy, each base sheet comprising a single, unitary sheet, the one or more base sheets forming unitary side wall portions having apertures therein cut into the respective base sheet to promote circulation of heated fluid through the side wall portions and forming side wall component connection portions, such that the side wall portions and the side wall component connection portions withstand temperatures and pressures exerted on the side wall portions by the heated fluid within the deep frying apparatus during the cooking process, the unitary side wall portions comprising substantially flat surfaces and the component connection portions comprising substantially flat surfaces;

a bottom wall comprising a base sheet comprising a single, unitary sheet comprising at least one of a metal or metal alloy, the base sheet forming a unitary bottom wall portion having flow apertures therein cut into the respective base sheet to promote circulation of heated fluid through the bottom wall portion and forming bottom wall component connection portions with the bottom wall portion and the bottom wall component connection portions comprising substantially flat surfaces, such that the bottom wall portions and the bottom wall connection portions withstand temperatures and pressures exerted on the side wall portions by the heated fluid within the deep frying apparatus during the cooking process, the bottom wall being securely attached to the side walls to define a food product receiving space; and a plurality of shelves disposed within the food product receiving space, each of the shelves having a pivot end side and a raising end side and being pivotally connected to opposing side walls proximal to the pivot end side and pivotably movable between a stackable horizontal position and a stackable vertical position in the food product receiving space formed by the side walls and bottom wall, each of the shelves comprising a base sheet comprising a single, unitary sheet comprising at least one of a metal or metal alloy, the base sheet forming a unitary shelf portion having flow apertures therein cut into the respective base sheet to promote circulation of heated fluid through the shelf portion, such that the shelves withstand temperatures and pressures exerted on the side wall portions by the heated fluid within the deep frying apparatus during the cooking process, the base sheets forming substantially flat surfaces on which food products are placeable, each of the base sheets also comprising component connection portions with substantially flat surfaces.

2. The basket apparatus according to claim 1 wherein at least one of the one or more base sheets of the side walls forms two or more side walls, the base sheet being bent to form corners where the respective side walls converge.

3. The basket apparatus according to claim 2 wherein the single unitary base sheet forms a back side wall and two opposing side walls that comprise the plurality of side walls and corner portions that comprise a front end side wall portion.

4. The basket apparatus according to claim 2 wherein the single unitary base sheet has additional flow apertures therein.

5. The basket apparatus according to claim 2 wherein the flow apertures in the single unitary base sheet comprise at least one of a different size or different shape from the apertures within the unitary side wall portions of the single unitary base sheet.

6. The basket apparatus according to claim 2 wherein the single unitary base sheet forms a back side wall and two opposing side walls that comprise the plurality of side walls and corner portions that comprise a front end side wall portion and the single unitary base sheet has additional flow apertures therein that comprise at least one of a different size or different shape from the apertures within the unitary side wall portions of the single unitary base sheet, the additional flow apertures being in the front end side wall portion and in side portions of the two opposing side walls of the plurality of side walls.

7. The basket apparatus according to claim 6 wherein the unitary side wall portions of the two opposing side walls include one or more end apertures that comprise a different shape.

8. The basket apparatus according to claim 7 wherein the unitary side wall portions of the two opposing side walls mirror one another.

9. The basket apparatus according to claim 6 wherein the unitary side wall portions of the back side wall comprise a different structure from the unitary side wall portions of the two opposing side walls.

10. The basket apparatus according to claim 6 wherein the unitary side wall portions of the back side wall comprise an upper unitary portion and a lower unitary portion, with the upper unitary portion have different sized apertures from the lower unitary portion.

11. The basket apparatus according to claim 1 wherein the unitary portions of the plurality of sidewalls, the bottom wall, and the shelves comprise interconnecting tab portions having substantially flat surfaces and wherein surface areas of the substantially flat surfaces of the component connection portions of the plurality of sidewalls, the bottom wall, and the shelves are greater in size than surface areas of the generally flat surfaces of the interconnecting tab portions.

12. The basket apparatus according to claim 1 wherein the bottom wall comprises a fixed shelf for food products above which the pivotably movable plurality of shelves are stackable in the horizontal positions within the food product receiving space.

13. The basket apparatus according to claim 1 wherein each of the shelves comprises hinge members pivotally connected to opposing side walls proximal to the pivot end side, the hinge members for each successive shelf being connected at an equidistance from the hinge members for the respective shelf below so that an approximately constant vertical space is created between the adjacent shelves when the shelves are in the horizontal positions.

14. The basket apparatus according to claim 13 wherein the hinge members of the plurality of shelves are rotatable secured at fixed positions on the two opposing side walls of the plurality of side walls proximal to a back side wall of the plurality of side walls, the fixed positions being staggered from the fixed positions for the hinge members of an upper positioned shelf of the plurality of the shelves closest to corners between the opposing side walls and the back side wall to the fixed positions for the hinge members of the lowest positioned shelf that are farthest from the corners between the opposing side walls and the back side wall to facilitate the stackability of the plurality of shelves.

15. The basket apparatus according to claim 1 further comprises a basket hanger and wherein a back side wall of the plurality of side walls comprises at least one hanger connection portion to which the basket hanger is secured.

16. The basket apparatus according to claim 15 wherein the at least one hanger connection portion comprises an upper hanger connection portion and a lower hanger connection portion having a unitary portion therebetween with apertures cut into the unitary portion, the basket hanger comprising an extended attachment to both the upper hanger connection portion and the lower hanger connection.

17. The basket apparatus according to claim 1 wherein each shelf of the plurality of shelves further comprises one or more spacer legs wherein the component connection portions of each shelf of the plurality of shelves comprise one or more spacer connection portions positioned proximal to the raising end side and that correspond to the one or more spacer legs, the one or more spacer legs fitting on and attached to the corresponding spacer connection portions.

18. The basket apparatus according to claim 17 wherein each of the one or more spacers connection portions on each of the shelves has a first side to which an attachment base of the corresponding spacer leg is attached and an opposing second side that forms a respective spacer platform on which a spacer leg of the upper adjacent shelf resides when the shelves are in the horizontal positions.

19. The basket apparatus according to claim 18, wherein an entire footprint of a bottom of each spacer leg of the upper adjacent shelf resides on the respective spacer platform of the lower adjacent shelf when the shelves are in the horizontal positions.

20. The basket apparatus according to claim 18 wherein the spacer legs secured to the shelves vertically align with corresponding spacer legs of adjacent shelves and corresponding baskets legs secured to the bottom wall.

\* \* \* \* \*